Oct. 25, 1949.  A. E. SANDERSON  2,485,846
SURVEYING INSTRUMENT
Filed Aug. 16, 1948  3 Sheets-Sheet 2
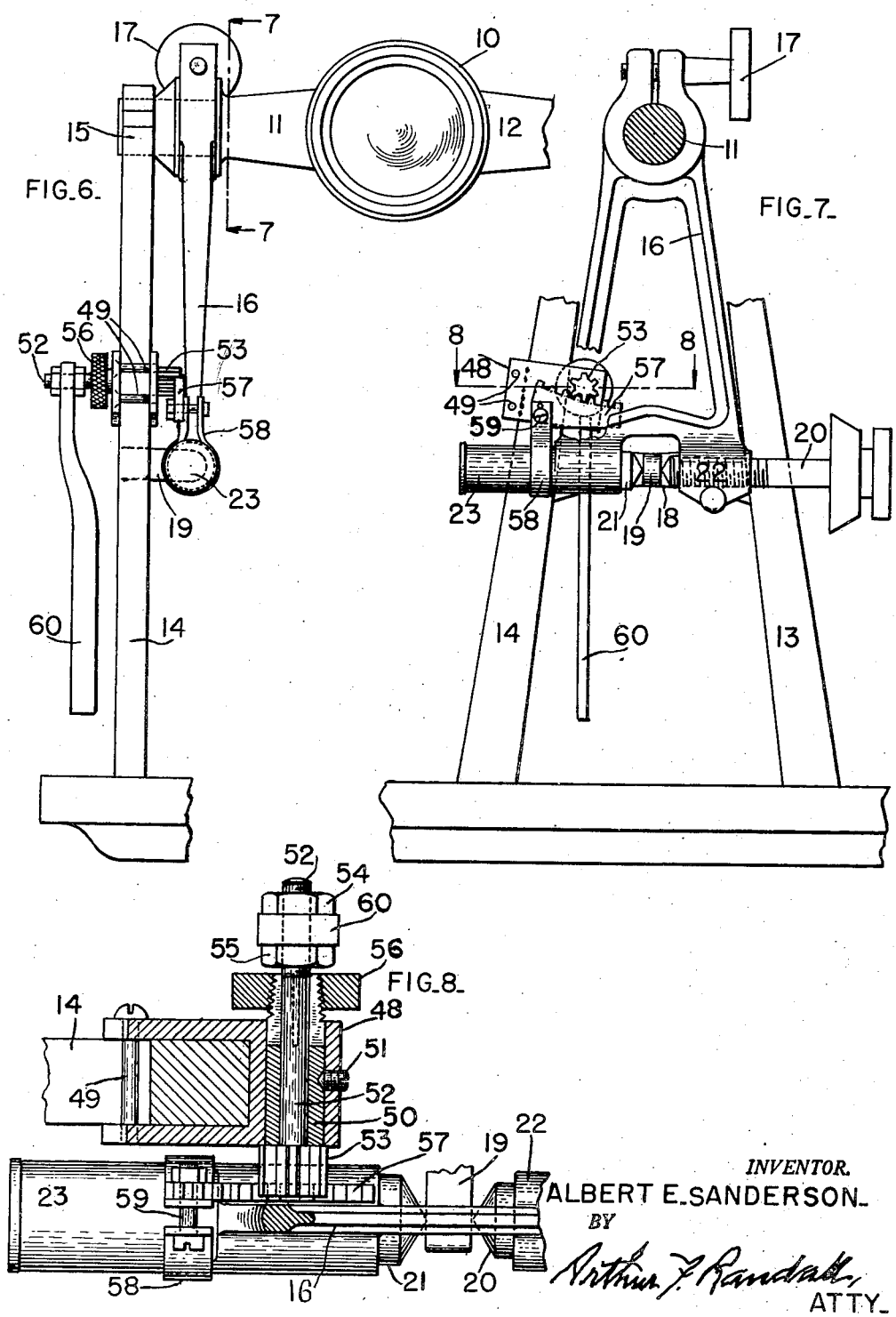
INVENTOR.
ALBERT E. SANDERSON
BY
Arthur F. Randall,
ATTY.

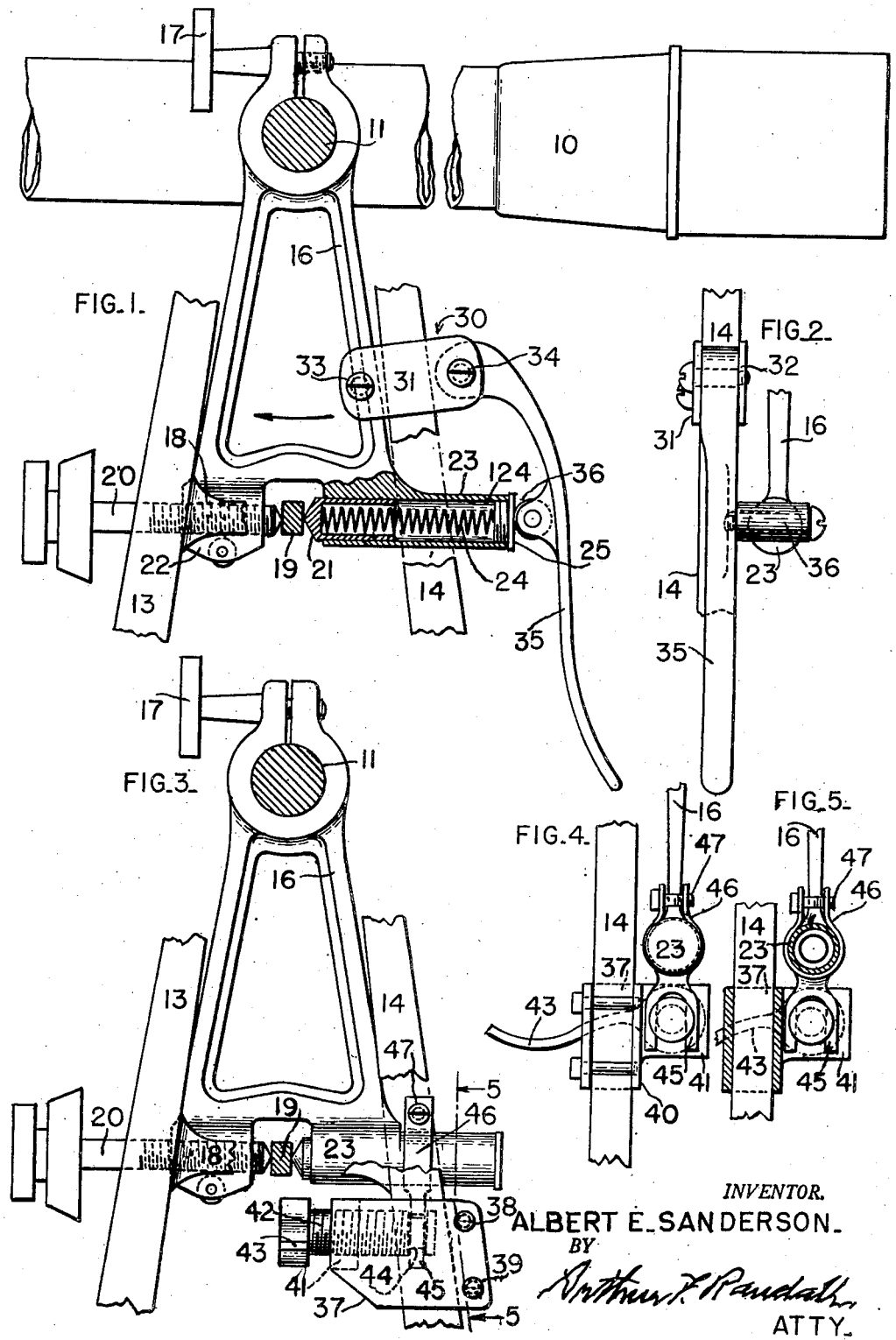

Oct. 25, 1949.  A. E. SANDERSON  2,485,846
SURVEYING INSTRUMENT

Filed Aug. 16, 1948  3 Sheets—Sheet 3

Inventor:
ALBERT E. SANDERSON.
BY
ATTY.

Patented Oct. 25, 1949

2,485,846

UNITED STATES PATENT OFFICE 2,485,846

SURVEYING INSTRUMENT

Albert E. Sanderson, Wayland, Mass.

Application August 16, 1948, Serial No. 44,470

9 Claims. (Cl. 33—71)

This invention relates to optical measuring instruments such as transits, alidades, theodolites and other distance-measuring surveying instruments provided with a sighting telescope that is universally adjustable pivotally, and it has for its primary object to improve the construction and facilitate the use thereof.

Another object of the invention is to provide an instrument of the class described with manually operable mechanism for pivotally adjusting the telescope thereof on its horizontal axis without disturbing the setting of the usual tangent screw of the instrument, thereby to so dispose the usual stadia hairs of the telescope relatively to the graduations of the usual leveling rod, as viewed through the telescope, that the indicated measurement can be more quickly and conveniently read than heretofore or while the telescope occupies its horizontal or otherwise fixed position.

Another object of the invention is to provide for yieldingly holding the telescope in the position to which it is shifted by said manually operable mechanism so that at the completion of the reading of the distance, or at the will of the operator, the telescope can be manually returned to the horizontal or otherwise fixed position originally determined for it by the usual tangent screw.

A further object of the invention is to provide, as a new article of manufacture, an attachment for an existing instrument of the class described which will be constructed and adapted to serve as the manually operable mechanism just referred to.

The invention therefore comprehends an improved instrument of the class described and also certain attachments for existing instruments of said class, all as set forth in the following description, the several novel features of the invention being particularly pointed out and defined in the claims at the close of the description.

While the preferred embodiments of the invention are disclosed herein, it will be understood that various changes may be made in the same without departing from the spirit and scope of the invention as defined in the appended claims.

In the accompanying drawings:

Figure 1 is a side elevation partly broken away and partly in section, of portions of a transit constructed in accordance with this invention.

Figure 2 is a side elevation of parts of Figure 1 as viewed from the right.

Figure 3 is a side elevation, partly broken away and partly in section, of portions of a transit illustrating a second embodiment of the invention.

Figure 4 is a front elevation of parts of Figure 3 as viewed from the right.

Figure 5 is a section on line 5—5 of Figure 3.

Figure 6 is a front elevation of parts of a transit illustrating a third form of the invention.

Figure 7 is a section on line 7—7 of Figure 6.

Figure 8 is a section somewhat enlarged, taken on line 8—8 of Figure 7.

Figure 9:
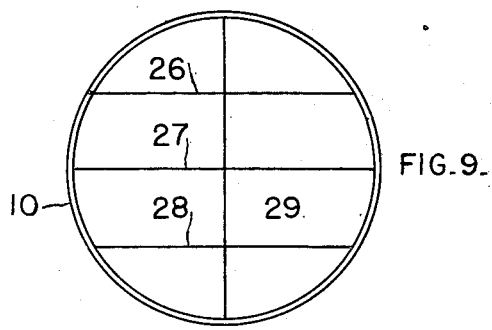
Figure 9 shows the usual arrangement of the cross-hairs of the telescope as viewed through the latter.

This invention provides manually operable mechanism to be attached to, or made a part of, a transit, alidade, theodolite or other surveying instrument, to angularly adjust the telescope thereof a few degrees below a sighted position in order to accurately read a distance indicated by the relationship between the hairs of the telescope and the graduations of the leveling rod after the telescope has been sighted upon the latter. Heretofore, this adjustment of the telescope has been manually effected by adjustment of the tangent screw of the instrument by means of which the telescope is leveled preparatory to reading elevation and distance. This previous practice was objectionable for the reason that the setting of the usual tangent screw holding the telescope in horizontal or other fixed position was lost thereby making it necessary for the surveyor to carefully readjust the tangent screw in order to restore the telescope to its original horizontal or other fixed position as was frequently required. My invention obviates this objectionable feature heretofore characterizing instruments of the class referred to.

In Figs. 1 to 8, inclusive, of the accompanying drawings I have embodied each of several different forms of attachments contemplated by this invention in a transit which otherwise may be of well known construction.

A transit comprises a telescope 10, Figs. 1 and 6, provided upon opposite sides thereof, and intermediate its ends, with axially alined trunnions 11 and 12 whose outer ends are rotatably supported in bearings provided at the upper ends of a pair of spaced-apart standards so that the telescope may, at times, be angularly adjusted on a horizontal axis. The two standards referred to are, as usual, rigidly connected at their lower ends to a circular base plate or member (not shown) which is supported for rotative adjustment on a vertical axis that intersects the axis of the telescope and also the alined axes of the trunnions 11 and 12.

As herein shown, each of the standards referred to above comprises a pair of side bars 13 and 14 whose upper ends are constructed with a bearing 15, Fig. 6, within which the outer end of the proximate telescope trunnion is mounted with provision for rotative adjustment. On the telescope trunnion 11 it is customary to mount the split hub of a depending clamp-arm 16, said split hub being equipped with a clamp screw 17 by means of which said hub may be fixedly clamped to said trunnion. The pair of side bars 13 and 14 that are adjacent to the clamp arm 16 are connected by an integral cross-bar 18 that is made at its middle, as usual, with a laterally projecting abutment lug 19 occupying a position between the inner end of a tangent screw 20 and a spring-pressed plunger 21. The threaded shank of tangent screw 20 occupies a threaded hole formed through a boss 22 provided at the lower end of clamp arm 16 and the inner end of said threaded shank is normally held against one side of the fixed lug 19 by a spring 24 and a spring-pressed plunger 21, said spring and plunger being mounted within a second boss 23 of arm 16 that is formed with a chamber 124, Fig. 1, to receive them. Plunger 21 is slidably mounted within chamber 124 and one end of the spring bears against the same while the opposite end of said spring bears against an exteriorly threaded plug 25 that is screwed into the interior threaded outer end of the chamber. As will be clear the spring 24 yieldingly maintains the end of tangent screw 20 against one side of lug 19 so that angular adjustment of the telescope in either direction on its horizontal axis can normally be effected by manual rotation of the tangent screw when leveling the telescope.

Figure 10:
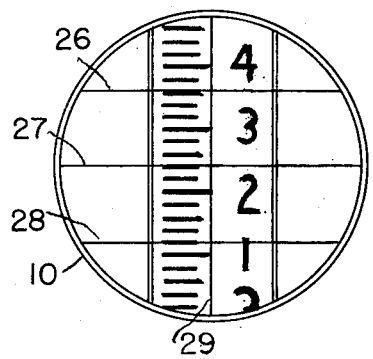
Figure 10 illustrates the relationship of the cross-hairs of the telescope and the graduations of the leveling rod, as viewed through the telescope while the latter occupies its horizontal or otherwise fixed position and is disposed at a distance from said rod.

Within the telescope 10 are mounted three horizontal cross-hairs 26, 27 and 28, Fig. 9, and one vertical cross-hair 29. When the telescope occupies a horizontal position the middle horizontal cross-hair 27 is used in conjunction with a distant level rod as usual to determine the elevation of the point upon which the rod is placed. The rod reading for elevation is obtained by observing the position of this hair 27 on the face of the rod which is calibrated as shown in Fig. 10. The reading in Fig. 10, for example is 3.24 feet.

Figure 11:
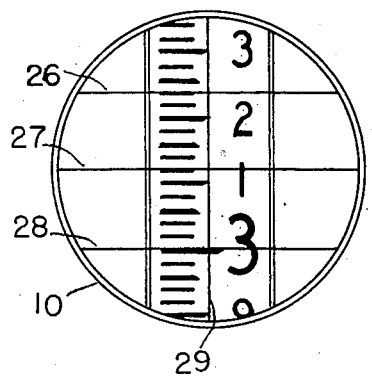
Figure 11 illustrates the relationship of the cross-hairs of the telescope and the graduations of the leveling rod after adjustment of the telescope by means of the manually operable mechanism hereinafter described in detail.

When the distance from the telescope to the rod is also desired the rod interval between the upper and lower cross-hairs 26 and 28, respectively, is determined and this value ($s$) substituted in the formula:

Distance equals 100$s$ plus $c$ in which $c$ is an instrument constant generally taken as 1 foot. It is common practice to determine this interval by tilting the telescope on its horizontal axis until the lower hair 28 rests on, or coincides with, an even foot mark on the rod since the required subtraction may thus be accomplished mentally much more easily than otherwise as will be clear from Fig. 11 which is a view through the telescope after tilting the latter as described.

To make it possible to place the instrument in a horizontal position a spirit level (not shown) is mounted upon the base underneath the telescope as usual and when the bubble of the level is at the center of the level-tube the line of sight is horizontal. The common practice in leveling is to bring the bubble approximately to the center of the tube while clamp arm 16 is loose on its trunnion 11 and then to fix the clamp arm 16 tightly to its trunnion by means of the usual telescope clamp screw 17. The bubble is then brought exactly to the center of the spirit level tube through the use of the tangent screw 20. This operation requires about 30 seconds and at its conclusion the telescope is horizontal and in position to read the elevation on the distant level rod.

The next operation of reading the distance has heretofore involved rotatively adjusting the tangent screw 20 until the lower cross-hair 28 coincides with an even foot mark on the level rod and during this operation both the setting of the telescope and the setting of the tangent screw were lost, which was highly objectionable for the reason that when the telescope is turned on its vertical axis for a new position of the level rod it was necessary to again level the telescope by adjustment of the tangent screw, to permit the above sequence of readings to be repeated.

As so far described the construction and operation of the transit are as heretofore.

Figs. 1 and 2 of the drawings illustrate parts of an existing transit equipped with an attachment embodying one form of the invention. This attachment comprises a bracket element 30 including two plates 31 and 32 adapted to be fitted against the opposite sides of the side bar 14 of the transit standard that is in proximity to the clamp arm 16, said plates being tightly clamped in position upon said side bar by two screws 33 and 34 occupying apertures formed in said plates. The apertures in the plate 31 are smooth while those in the plate 32 are threaded for threaded engagement with the ends of the screws 33 and 34.

Pivotally mounted upon the screw 34 between the two plates 31 and 32 is a lever 35 carrying a roller 36 which may normally rest against the outside of the plug 25 that is an element of the clamp arm 16 as shown in Fig. 1.

When the telescope 10 is to be adjusted angularly on the trunnions 11 and 12 to read distance the lever 35 is manually swung toward side bar 14 until the cross-hairs of the telescope, as viewed through the latter, are disposed relatively to the visible graduations of the level rod as above described. As will be clear, this is accomplished without disturbing the adjustment of the tangent screw 20 so that immediately upon release of lever 35 the spring 24 acts to return the lever-adjusted parts of the transit, as well as the lever 35 itself, to their normal positions where the tangent screw is against the abutment lug 19 and the telescope occupies its horizontal or otherwise fixed position.

Figures 3, 4 and 5 of the drawings illustrate an attachment for an existing transit comprising a bifurcated bracket element 37 whose oppositely disposed jaws embrace and are fixedly clamped to the side bar 14 of the transit standard that is in proximity to the clamp arm 16 of the transit by means of two clamping screws 38 and 39 which have threaded engagement with tapped holes provided in the jaw 40, Fig. 4, of the bracket element. At its one end the bracket element 37 is made with a laterally projecting lug 41 which is formed with a threaded aperture within which is mounted the threaded shank of a screw 42. This screw is provided at its one end with a laterally projecting handle or arm 43 and adjacent to its opposite end with an annular groove 44 that is loosely occupied by the tines of a fork 45 depending from a split collar 46 that extends around and is fixedly clamped to the boss 23 of the clamp arm 16 by a screw 47.

The axis of the screw 42 is disposed at right angles to the axis of the trunnion 11 to which the clamp arm 16 is normally fixed by the screw 17. It will thus be clear that when distance is to be read the telescope may be adjusted angularly on the axes of its trunnions by downward manual pressure upon the handle arm 43 which effects endwise movement of the screw which in turn acts through the fork 45 to swing clamp arm 16 toward the left in Fig. 3 thus lowering the forward end of the telescope until the cross-hairs within the latter register with the graduations of the level rod as desired when reading distance. To restore the clamp arm 16 to its normal position shown in Fig. 3 after reading the distance it is, of course, necessary to reversely operate the screw 42 until the inner end of the tangent screw 20 is returned to position against the fixed abutment lug 19. Normally the screw 42 holds the telescope against angular displacement in either direction and in this respect differs from the other embodiments of the invention herein shown.

The attachment illustrated in Figs. 6, 7 and 8 comprises a bifurcated bracket 48 whose oppositely disposed arms or tines embrace and are fixedly clamped to the side-bar 14 of the transit by two screws 49 which are in threaded engagement with tapped holes provided through one of said arms. Bracket 48 is made with a transverse bore within which is mounted a tubular bushing 50, Fig. 8, that is fixed in position therein by a set screw 51. At its outer end this bushing extends beyond the exterior of the bracket 48 and this projecting portion is split longitudinally to provide a group of clutch segments which is formed exteriorly with a tapered thread to receive thereon a thumb nut 56 whose interior is provided with a complementary thread.

Mounted within the tubular bushing 50 is a spindle or shaft 52 whose inner end is provided with a pinion 53 and whose outer end portion extends beyond the outer end of the bushing and is threaded to receive upon it two nuts 54 and 55 and the apertured hub of a handle lever 60 which projects downwardly from shaft 52. As will be clear the handle lever 60 is freely operable to turn shaft 52 when nut 56 is loose but is frictionally and therefore yieldingly clutched to the outer end of fixed bushing 50 when nut 56 is tightened.

Pinion 53 is in mesh with an arcuate rack of gear teeth 57 that is concentric with the alined axes of trunnions 11 and 12 and fixedly connected with the boss 23 of clamp arm 16 by a strap 58 to which the rack is fixed by a bolt 59 that also clamps the strap in position on the boss. It will be clear that finger pressure against handle lever 60 directed toward the right, Fig. 7, will act through shaft 52, Fig. 8, pinion 53, rack 57 and strap 58, to swing clamp arm 16 in that direction and lower the front end of the telescope as required in reading distance, and that this movement of the clamp arm 16 is yieldingly opposed by spring-pressed plunger 21. It will also be clear that if nut 56, Fig. 8, is loose when this movement of the clamp arm is completed, the clamp arm and telescope will be returned by plunger 21 to their normal positions where tangent screw 20 is against the fixed abutment lug 19 as the finger pressure on handle-lever 60 is relieved.

It is also true that if the nut 56 be set up tight, the clamp arm, and the telescope also, will be held in any displaced positions by the clutch segments of shaft 52 until nut 56 is loosened, whereupon the parts may be returned to their normal positions by the spring-pressed plunger 21. In many instances it will be found convenient to have the nut 56 permanently occupy a position where the clutch segments of bushing 50 yieldingly grip the shaft 52 continuously so that the clamp arm 16 is manually adjusted in both direction by finger pressure upon the handle lever 60, said nut being loosened only while leveling the telescope.

The advantages of each of the above described mechanisms are two-fold: (1) after reading the elevation with the telescope in the horizontal position the telescope can be quickly and easily brought on to an even foot mark for reading the distance by means of the handle of the mechanism, and (2) after reading the distance the handle of the mechanism may be returned to its normal position at which time the telescope is returned to its previous horizontal position either by the spring-pressed plunger 21, by means of screw 42, or by means of handle 60, and is ready for the next position of the leveling rod. Thus the saving of time by use of either of the described mechanisms is obvious.

It will be seen that any level or other normal position of the telescope may be preserved when distances must also be read. This condition will occur when the telescope line of sight is set at a constant grade, i. e., at a constant angular deviation from the horizontal.

In the operation of leveling it is often impossible to obtain a reading owing to brush and trees covering up the even foot mark of the leveling rod, or because the rod is close to the telescope and said mark is not within the field of vision of the instrument. Tilting the telescope by means of either of the above described mechanisms readily solves the problem while permitting the telescope to be readily returned to its previously set position.

On a well known make of transit the maximum movement of the clamp arm 16 at the tangent screw 20 amounts to about five-sixteenths of an inch. In terms of angular displacement of the telescope this is about 5 degrees and 18 minutes, which is also the maximum movement of that instrument. In terms of vertical linear displacement this amounts to 9 feet and 2 inches at 100 feet or 4 feet and 7 inches at 50 feet.

Those acquainted with surveying procedures will appreciate the fact that there are other situations in which it is desirable to tilt the telescope while still preserving capacity for quick return of the latter to the original setting of its line of sight. One example of this would be when the instrument is "set on line" on a distant point following which new points on the ground are set on line nearer to the telescope. The fact that the telescope constantly returns to its original setting provides a quick and easy means of checking against movement of the line of sight from the original setting due to settlement, etc.

It will often be found useful to have the handle remain in a set position, i. e. not return of its own accord to its normal position. Two mechanisms of this sort are above described, viz., the screw type shown in Figs. 3, 4 and 5 which is inherently stable and resists the force of the spring-pressed plunger 21 tending to return the telescope to its original position, and the geared type shown in Figs. 6, 7 and 8 which is provided with an adjustable friction brake so that the mechanism may be returned to its original condition of adjustment through the action of the spring-pressed plunger 21, or its equivalent, or be prevented from being returned by said spring means by the brake. With the brake in its "on" condition the handle may readily be placed in any desired position, while when in its "off" condition the telescope will be returned to its original setting by the spring means referred to.

Mechanisms such as those above described will be found useful in situations where it is required to record not only rod reading and distance, but also the angular deviation of the telescope from the horizontal. The latter reading is determined by means of a vertical arc mounted at the opposite end of the telescope axis from the position occupied thereon by the clamp arm 16, and during this operation the telescope must remain in position.

What I claim is:

1. In a distance measuring instrument of the class described, the combination with the telescope provided interiorly with horizontal stadia hairs, the support on which said telescope is mounted for pivotal adjustment on a horizontal axis, and the means including a tangent screw and spring for holding the telescope in its adjusted position while being sighted upon the usual leveling rod, of mechanism mounted upon said support and manually operable to adjust said telescope angularly on said axis against the opposition of said spring and in a direction to depress the forward end of the telescope without disturbing the adjustment of said screw, thereby to so dispose the stadia hairs of the telescope relatively to the graduations of the leveling rod as viewed through the telescope that at least one of said hairs registers with a graduation of said rod.

2. In a distance measuring instrument of the class described, the combination with the telescope provided interiorly with horizontal stadia hairs, the support on which said telescope is mounted for pivotal adjustment on a horizontal axis, the clamp arm connected with the telescope, the spring carried by the clamp arm and acting against said support to yieldingly urge said telescope in a direction to elevate the forward end thereof, and the tangent screw carried by said clamp arm and engaging said support by means of which the clamp arm and telescope are angularly adjusted in either direction on said axis and held in a predetermined fixed position, of a member adjustably mounted on said support and manually operable to swing said clamp arm and telescope on said axis in a direction to lower the forward end of the telescope against the opposition of said spring without disturbing the adjustment of said tangent screw.

3. In a distance measuring instrument of the class described, the combination with the telescope provided interiorly with horizontal stadia hairs, the support on which said telescope is mounted for pivotal adjustment on a horizontal axis, the clamp arm connected with the telescope, the spring carried by the clamp arm and acting against said support to yieldingly urge said telescope in a direction to elevate the forward end thereof, and the tangent screw carried by said clamp arm engaging said support by means of which the clamp arm and telescope are angularly adjusted in either direction on said axis and held in a predetermined fixed position, of a bracket fixedly secured to said support; a member adjustably mounted upon said bracket and manually operable to swing said clamp arm and telescope on said axis in a direction to lower the forward end of the telescope against the opposition of said spring and without disturbing the adjustment of said tangent screw.

4. In a distance measuring instrument of the class described, the combination of claim 3 wherein said member is a lever fulcrumed on said bracket.

5. In a distance measuring instrument of the class described, the combination of claim 3 wherein said member is a screw provided at its one end with a handle and having a threaded shank occupying a threaded hole provided in said bracket, the opposite end of said screw being cooperatively associated with said clamp arm.

6. In a distance measuring instrument of the class described the combination of claim 3 wherein said member is a screw provided at its one end with a handle and having a threaded shank occupying a threaded hole provided in said bracket, the shank of said screw being formed adjacent to its opposite end with an annular groove that is occupied by an arm fixedly attached to said clamp arm so that rotation of said screw acts through said arm to angularly adjust said clamp arm.

7. A distance measuring instrument of the class described according to claim 3 wherein a shaft is provided that is rotatably supported intermediate its ends by said bracket; wherein said member is fixedly connected with one end of said shaft; wherein a pinion is fixedly connected with the opposite end of said shaft, and wherein an arcuate gear segment is fixedly connected with said clamp arm and in mesh with said pinion.

8. A distance measuring instrument of the class described according to claim 7 wherein a friction clutch is provided on said bracket that is co-operatively associated with said shaft to yieldingly hold the same in the position to which it is manually adjusted by said member.

9. A distance measuring instrument of the class described according to claim 2 wherein a friction clutch is provided for yieldingly holding said member, said clamp arm and said telescope in the positions into which they are adjusted by said member.

ALBERT E. SANDERSON.

No references cited.